(12) United States Patent
Birkert et al.

(10) Patent No.: US 7,543,471 B2
(45) Date of Patent: Jun. 9, 2009

(54) WASTE GAS HEAT EXCHANGER

(75) Inventors: Arndt Birkert, Bretzfeld (DE); Hans Glöckl, Stuttgart (DE); Knut Haarscheidt, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 11/357,414

(22) Filed: Feb. 21, 2006

(65) Prior Publication Data

US 2006/0201653 A1    Sep. 14, 2006

Related U.S. Application Data

(63) Continuation of application No. 10/476,877, filed as application No. PCT/EP03/00544 on Jan. 21, 2003, now abandoned.

(30) Foreign Application Priority Data

Feb. 1, 2002    (DE) .................................. 102 04 107

(51) Int. Cl.
   B21D 26/02    (2006.01)
   B21D 15/02    (2006.01)
   F28D 7/16    (2006.01)
(52) U.S. Cl. .................. 72/370.22; 72/59; 29/890.03; 165/82; 165/160; 165/906
(58) Field of Classification Search ............ 165/160, 165/906, 177, 81–83; 29/890.043, 890.052, 29/890.053, 890.03; 72/58, 59, 370.22, 385
See application file for complete search history.

(56) References Cited

U.S. PATENT DOCUMENTS

| | | | |
|---|---|---|---|
| 910,192 A * | 1/1909 | Grouvelle et al. ........... 165/177 |
| 1,955,006 A * | 4/1934 | Mateer et al. ................ 165/160 |
| 2,063,490 A | 12/1936 | Davis | |
| 4,364,252 A | 12/1982 | Koizumi | |
| 4,721,069 A | 1/1988 | Kreider | |
| 4,748,836 A | 6/1988 | Hoeboer et al. | |
| 5,343,620 A * | 9/1994 | Velluet ................. 29/890.052 |
| 5,848,676 A | 12/1998 | Deigner | |
| 6,086,110 A | 7/2000 | Lee et al. | |
| 6,269,870 B1 | 8/2001 | Banzhaf et al. | |
| 2001/0006102 A1 | 7/2001 | Nishimura et al. | |

FOREIGN PATENT DOCUMENTS

| | | |
|---|---|---|
| CH | 378353 | 6/1964 |
| DE | 28 22 999 C2 | 3/1988 |

(Continued)

*Primary Examiner*—Leonard R Leo
(74) *Attorney, Agent, or Firm*—Foley & Lardner LLP

(57) ABSTRACT

The invention relates to a heat exchanger, especially a heat exchanger for motor vehicles, comprising a bank of tubes through which a gaseous medium flows and around which a liquid coolant flows. The ends of said tubes are received in tube plates and are connected to the same in a material fit. The inventive heat exchanger also comprises a housing jacket which surrounds the bank of tubes and is connected, at the end thereof, to the tube plates. A coolant flows through said housing jacket. The tubes, tube plates and housing jacket are produced from a heat-resistant and corrosion-resistant metallic alloy. According to the invention, the housing jacket comprises at least one surrounding expansion flange.

18 Claims, 4 Drawing Sheets

FOREIGN PATENT DOCUMENTS

Figure 1:
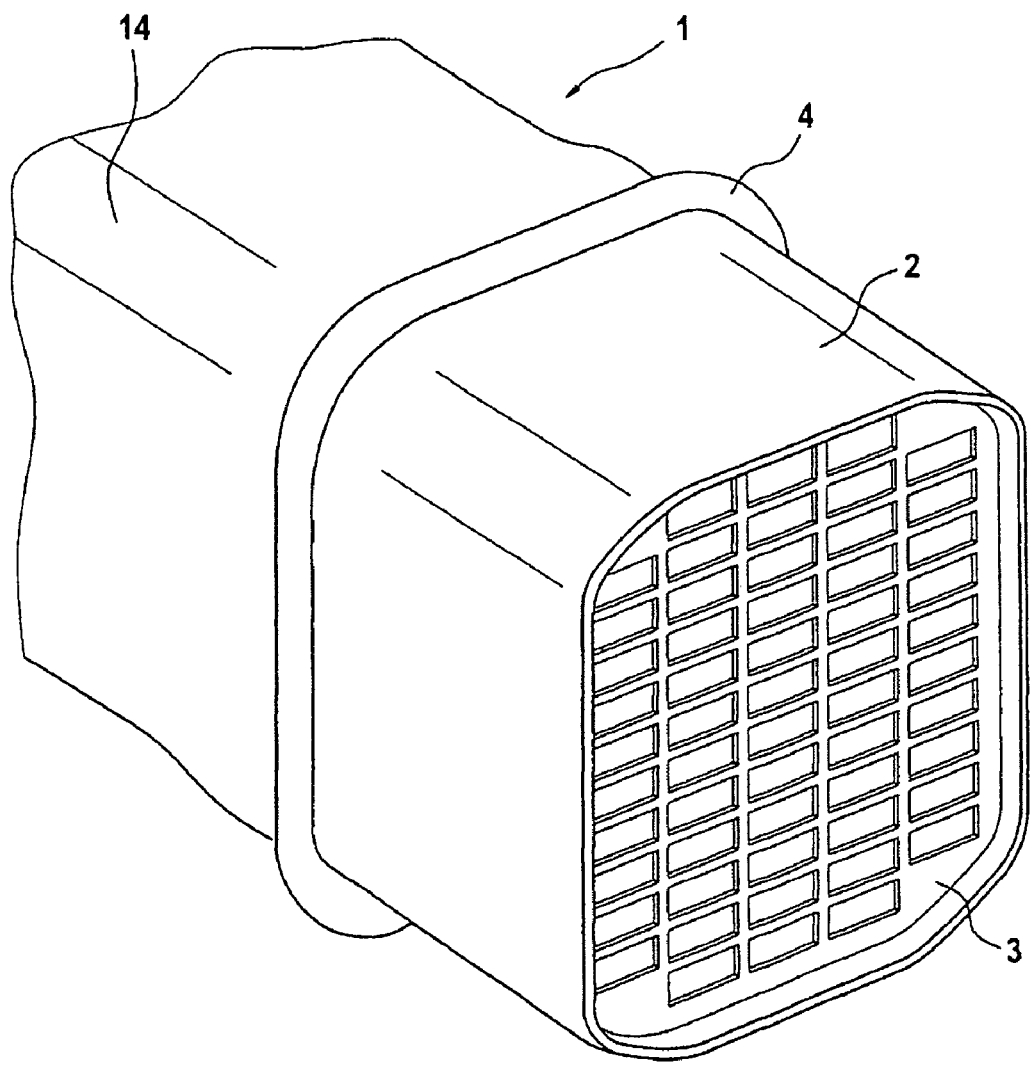

| | | |
|---|---|---|
| DE | 195 15 643 C1 | 7/1995 |
| DE | 44 41 192 C2 | 5/1996 |
| DE | 296 12 361 U1 | 10/1996 |
| DE | 199 07 163 A1 | 10/1999 |
| DE | 100 20 492 A1 | 10/2001 |
| DE | 100 49 048 C1 | 1/2002 |
| EP | 0 930 429 B1 | 7/2003 |
| GB | 1 585 045 | 2/1981 |
| JP | 61-223496 A | 10/1986 |
| JP | 62-282728 | 12/1987 |
| JP | 2001-272185 A | 10/2001 |

* cited by examiner

WASTE GAS HEAT EXCHANGER

The present application is a continuation of U.S. application Ser. No. 10/476,877, filed Nov. 13, 2003, the entire contents of which is incorporated herein by reference.

The invention is concerned with a heat exchanger, in particular an exhaust gas heat exchanger for motor vehicles, in accordance with the precharacterizing clause of patent claim 1, as disclosed by DE-A 199 07 163 of the co-applicant. The invention is furthermore concerned with a method for producing a housing jacket of an exhaust gas heat exchanger in accordance with the precharacterizing clause of patent claim 12.

In the case of the exhaust gas heat exchanger disclosed by DE-A 199 07 163, a bank of tubes has the exhaust gas of an internal combustion engine of a motor vehicle flowing through it and is cooled on the outside by a coolant which is taken from the coolant circuit of the internal combustion engine. Exhaust gas heat exchangers of this type, which are also called exhaust gas coolers, are used nowadays in the exhaust gas recirculation system (EGR) to cool the exhaust gas. In the case of the known exhaust gas cooler, the tube ends of the bank of tubes are welded in each case into a tube plate, i.e. are connected fixedly and tightly to these tube plates. The tube plates themselves are welded in turn to a housing jacket which surrounds the bank of tubes. The housing jacket has a coolant inlet opening and a coolant outlet opening and has the coolant flowing through it. During operation of an exhaust gas cooler of this type, the exhaust gas tubes have the hot exhaust gas flowing through them on the inside and have coolant washing around them on the outside. This coolant also washes around the inside of the housing jacket. The exhaust gas tubes therefore reach a substantially higher temperature than the housing jacket, which results in different expansions between the exhaust gas tubes and housing jacket: this leads to thermal stresses, i.e. to compressive stresses in the tubes and tensile stresses in the housing jacket. The tubes press on the tube plates and cause deformation or even damage to the tube/plate connections or the tube plate/housing connections, i.e. the exhaust gas cooler can become leaky.

In similar exhaust gas coolers in EP-A 0 930 429 a "sliding fit" has therefore already been proposed, i.e. the bank of tubes is arranged in the housing of the exhaust gas cooler by means of a fixed bearing and a movable bearing, i.e. the tubes can expand unimpeded owing to the tube plate being mounted in a sliding manner in the housing. Although thermal stresses are avoided as a result, an increased structural outlay is required for a sliding fit of this type; in addition, there is the risk that if the sliding fit is insufficiently sealed, coolant will pass into the exhaust gas or exhaust gas will pass into the coolant.

It is therefore the object of the present invention to improve a heat exchanger of the type mentioned at the beginning to the effect that the stresses caused by temperature are compensated for by simple measures, i.e. impermissible loads on the material are avoided.

This object is achieved for the heat exchanger according to the generic type by the characterizing features of patent claim 1, i.e. the housing jacket is provided with at least one encircling expansion bead. This bead provides the housing jacket with sufficient elasticity in the longitudinal direction of the tubes, thus making it possible for the housing jacket to expand elastically so as to follow the more pronounced expansion of the exhaust gas tubes without in the process being deformed to an impermissible extent or impairing the weld seam connections between the tubes and plate and plate and housing. In addition, the expansion bead can be produced in a simple manner, i.e. without substantially greater costs, and does not involve any sort of sealing problems. It is also possible—to increase the elasticity or to enlarge the spring deflection—to provide a plurality of extension bead in the manner of an expansion bellows.

According to one advantageous refinement of the invention, the housing jacket is produced integrally, for example from a welded tube, it also being possible for said tube to have a noncircular cross section, for example a rectangular cross section.

According to a further advantageous refinement of the invention, the expansion bead is produced by "internal high pressure forming" (IHF) of the housing jacket. The IHF, which is also called hydroforming, is a process which is known per se and in which closed housing parts are "inflated" by means of a liquid pressure medium (water). The housings which are to be deformed are placed into dies having the appropriate contour and are then acted upon from the inside by means of a pressure fluid in such a manner that the material of the housing is placed against the contour of the mold.

According to a further advantageous refinement of the invention, the expansion bead can additionally be produced by axial compression, i.e. after a bead in preliminary form has been produced in a first step by IHF.

In further advantageous refinements of the invention, dimensions for the housing jacket, in particular the wall thickness thereof, and the dimension of the expansion bead are specified, said dimensions being particularly advantageous and resulting in the desired elasticity of the housing jacket under the loads which occur. In this case, it is also ensured that the material of the housing jacket does not over-expand during production of the expansion bead, but that the designated strength is achieved.

Finally, one advantageous refinement of the invention provides a method which enables simple and cost-effective production of the expansion bead in the housing jacket of the exhaust gas heat exchanger. According to this method, the expansion bead is produced in two stages, namely first of all by means of internal high pressure forming to give a bead which is in a preliminary form and is not yet in the final form, in particular does not yet have the final height (external dimensions). In a second method step, the housing jacket is compressed axially, thus causing the material of the bead in preliminary form to flow further outward, and the expansion bead then obtains its final form. This two-stage method avoids overloading the material and, at the same time, achieves a defined contour of the expansion bead with a certain elasticity. This method can be used particularly easily for the housing jacket and does not cause any change in the construction of the exhaust gas heat exchanger.

Figure 2:
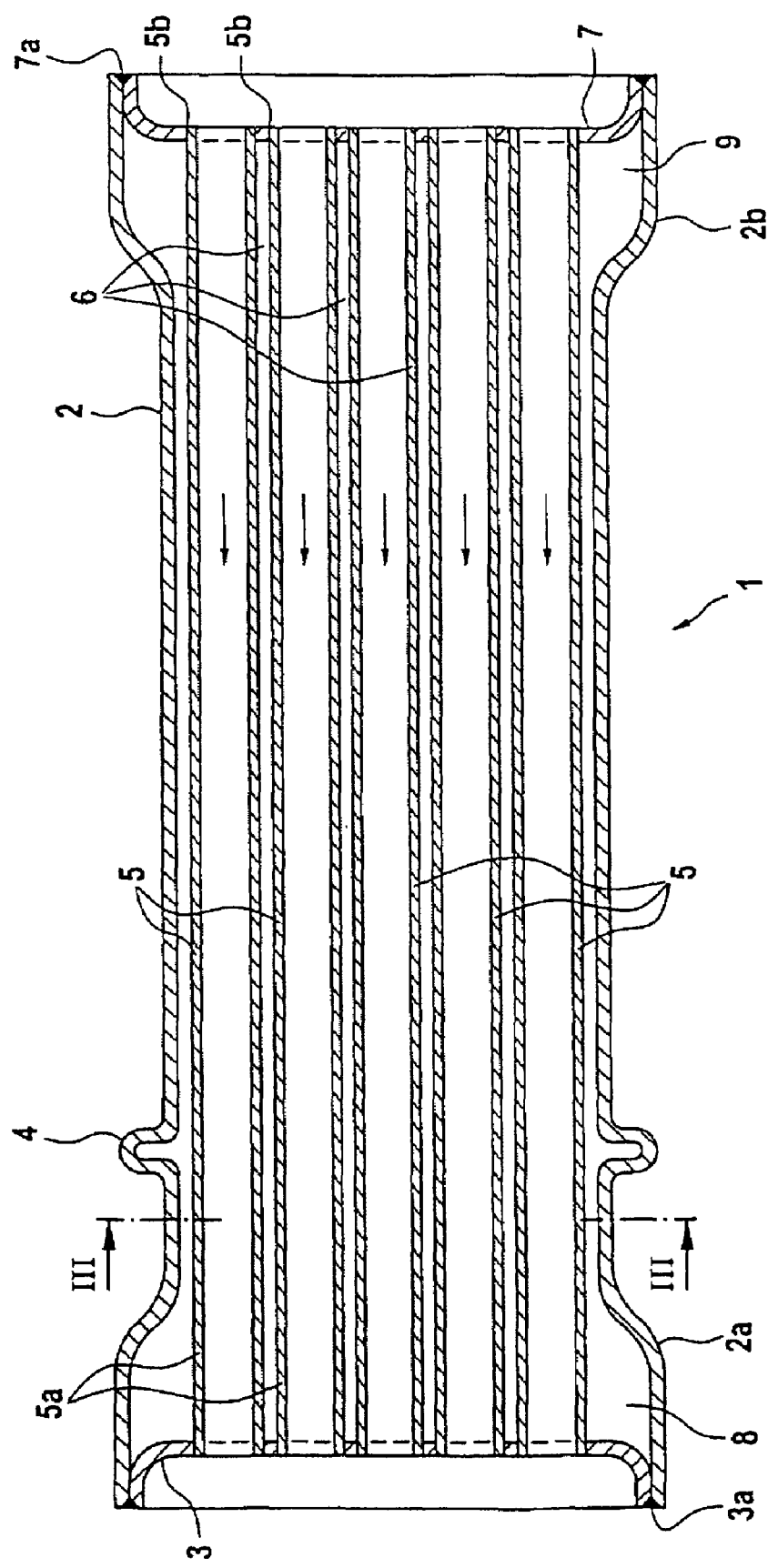
Figure 3:
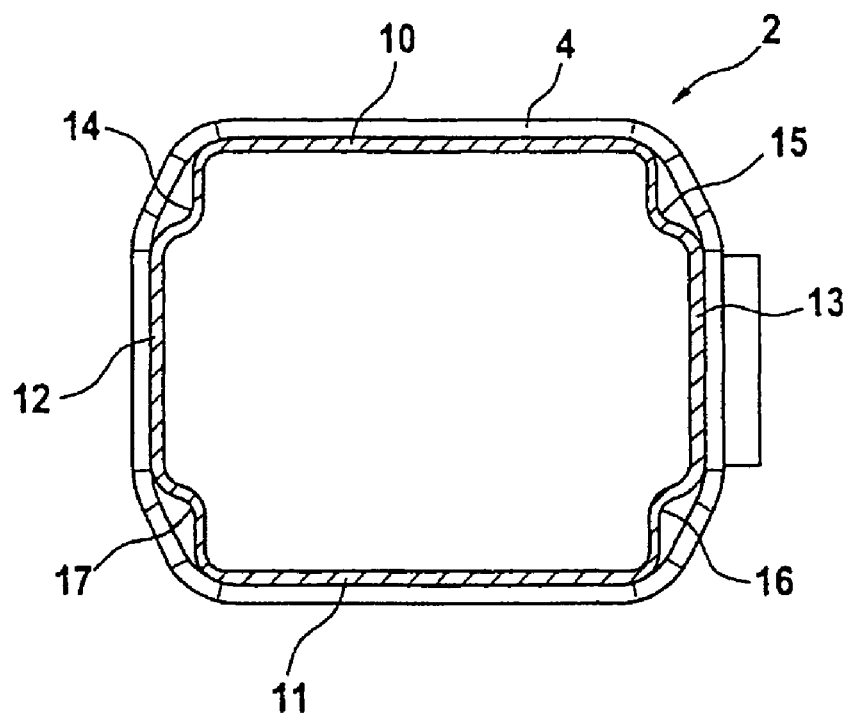
Figure 4:
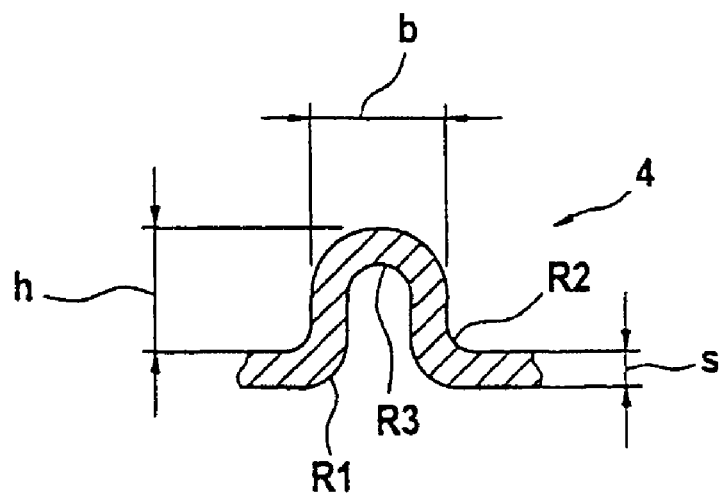
Figure 5:
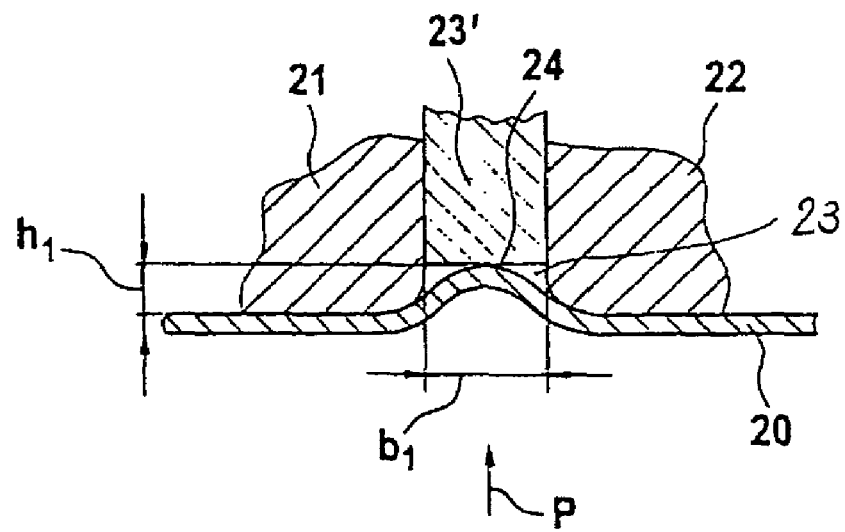
Figure 6:
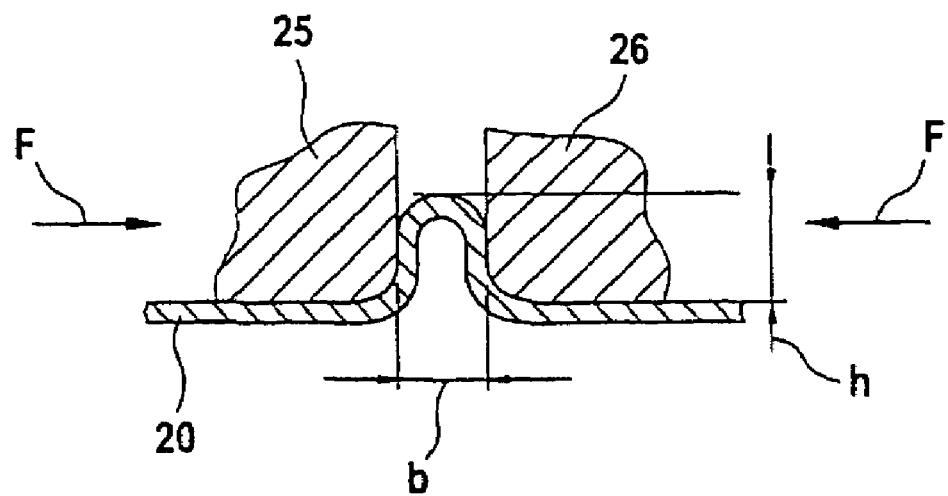

An exemplary embodiment of the invention is illustrated in the drawing and will be described in greater detail below. In the drawing:

FIG. 1 shows a perspective illustration of part of the exhaust gas heat exchanger, FIG. 2 shows a longitudinal section through the exhaust gas heat exchanger, FIG. 3 shows a cross section through the housing jacket of the exhaust gas heat exchanger, FIG. 4 shows an illustration of a detail of the expansion bead of the housing jacket, FIG. 5 shows a first method step for producing the expansion bead, and FIG. 6 shows a second method step for producing the expansion bead.

FIG. 1 shows, in a perspective illustration, part of an exhaust gas heat exchanger 1 as used in the form of an exhaust gas cooler for the exhaust gas recirculation system in diesel engines for motor vehicles. The exhaust gas heat exchanger 1, only the front half of which is illustrated, has a housing jacket 2 and a tube plate 3 in which exhaust gas tubes (not illustrated) are accommodated. An encircling expansion bead 4 is arranged in the front region of the housing jacket 2, which has approximately a rectangular cross section with beveled corners. This exhaust gas heat exchanger 1 is described in greater detail below, the same reference numbers being used for the same parts.

FIG. 2 shows the exhaust gas heat exchanger 1 in longitudinal section in a schematic illustration. The housing jacket 2 is produced from a closed, i.e. welded tube of stainless steel. A bank of tubes comprising a multiplicity of exhaust gas tubes 5 is arranged within this housing jacket 2. These exhaust gas tubes 5 are likewise produced from a stainless steel alloy which is, in particular, heat-resistant and corrosion-resistant. The cross section of the exhaust gas tubes 5 is preferably rectangular—as is apparent on the basis of the design of the tube plate 3 in FIG. 1. The exhaust gas tubes 5 are arranged with respect to one another in such a manner that they leave between them equidistant gaps 6 through which a liquid coolant, i.e. the coolant of the cooling circuit of an internal combustion engine (not illustrated), flows. The ends 5a, 5b of the exhaust gas tubes 5 are held in the tube plate 3 and in a further tube plate 7 and are welded tightly to these tube plates 3, 7. The tube plates 3, 7 are, for their part, welded in their circumferential regions 3a, 7a to the housing jacket 2 to the housing jacket 2. The housing jacket 2, the tube plates 3, 7 and the exhaust gas tubes 5 therefore delimit a defined space for the flow of the coolant. In its end-side regions 2a and 2b, the housing jacket 2 is somewhat expanded in terms of its cross section, so that it forms a respective annular channel 8 and 9 around the bank of tubes at this point. In this region, the coolant enters through a coolant inlet (not illustrated), flows through the equidistant gap 6 between the exhaust gas tubes 5, and passes to the second annular space 9, from where the coolant leaves the exhaust gas heat exchanger through a coolant outlet (not illustrated). To this extent, this exhaust gas heat exchanger is known, for example through the co-applicant's document which is mentioned at the beginning. The inflow and outflow of the exhaust gas via a diffuser (not illustrated here) or an outlet stub is also revealed in this document.

According to the invention, an expansion bead 4 is arranged in the housing jacket 2. This expansion bead 4, which can also be seen in FIG. 1 as the bead which encircles the entire circumference, gives the housing jacket 2, which is not very elastic in itself, an elasticity in the longitudinal direction of the exhaust gas tubes 5, said elasticity permitting the housing jacket 2 to follow the more pronounced expansion of the exhaust gas tubes 5. The exhaust gas tubes 5, which have hot exhaust gas flowing through them on their inside, absorb a higher temperature during operation than the housing jacket 2, around which the coolant washes, and therefore "grow" to a greater extent than the housing jacket. Compressive stresses are therefore produced in the exhaust gas tubes 5, these stresses continuing into the tube plates 3 and 7 and being transmitted by the latter via the weld seams to the housing jacket 2, in which a tensile stress then builds up. This tensile stress is intercepted owing to the elasticity of the expansion bead 4, so that impermissible deformation or even damage does not occur.

FIG. 3 shows a cross section through the housing jacket 2, i.e. without the bank of tubes being illustrated. The housing jacket 2 has an approximately rectangular cross section with in each case two parallel longer side surfaces 10 and 11 and two somewhat shorter side surfaces 12 and 13 lying opposite each other. Longitudinal beads 14, 15, 16, 17 for stiffening the entire cross section are formed in the transition regions of adjacent short and long side surfaces 12/10, 10/13, 13/11 and 11/12. One of these beads can also be seen clearly in FIG. 1—denoted by 14 there. The expansion bead 4 is situated somewhat offset to the rear of the plane of projection and surrounds the entire cross section of the housing jacket 2, i.e. it is of encircling design.

The cross section and the dimensions of this expansion bead 4 are illustrated in FIG. 4. The wall thickness of the housing is denoted by s and is s≈1.5 mm. The bead 4 has a width of b≈6 mm and a height of h≈6 mm. The bead is furthermore characterized by two transition radii R1 and R2 which correspond approximately to the wall thickness s, i.e. lie in the region of 1.5 mm. The outermost section of the bead is characterized by an inner radius of R3≈1.5 mm, i.e. approximately of the wall thickness S. These radii ensure that no impermissible expansions or stress peaks occur either during production or during operation.

FIG. 5 shows a first method step for producing the expansion bead 4 in the housing jacket 2. The housing jacket 2 is illustrated here only by a sector 20. The housing jacket 2 is placed into two mold halves 21 and 22, between which a cavity 23 is provided which is preferably closed to the outside by an insertable tool 23'. The housing jacket 20 is acted upon from the inside, illustrated by an arrow p, by hydroforming or by IHF, so that the housing jacket 20 is deformed in the region of the cavity 23 to the outside to height h1 and takes on a bead-shaped preliminary form 24. This bead 24 in preliminary form has a width b1 corresponding to the cavity 23 between the two mold halves 21 and 22.

FIG. 6 shows the second method step for producing the expansion bead 4—in this case the housing jacket 20 is arranged between two axially movable molds 25 and 26. After the hydroforming according to FIG. 5, the housing jacket 20 is compressed by means of the molds 25 and 26 in the axial direction, i.e. corresponding to the arrows F, so that the width of the bead is reduced from b1 (FIG. 5) to b and the height h1 (FIG. 5) is increased to h. After this method step of axial compression, the bead has obtained its final form in respect of height and width, i.e. it is finished in two consecutive different method steps.

The two method steps can be carried out in one mold, in which case the insertable tool 23', if the operation is carried out using an insertable tool of this type, has to be removed for the second method step. However, it is also possible to carry out the two method steps in a number of molds or in one follow-on mold.

The invention claimed is:

1. A method for producing an expansion bead in a tubular housing jacket, comprising a noncircular cross section, comprising the following method steps:
   provision of a housing jacket comprising a non-circular cross section comprising first and second longitudinal beads, wherein the housing jacket is cut to size;
   insertion of the housing jacket into an IHF mold and closing the mold;
   filling the mold and the housing jacket with a liquid pressure medium;
   deformation of the housing jacket by building up internal high pressure and producing a preliminary form of the bead (first deformation step);
   reduction of the internal high pressure; and
   production of the final form of the expansion bead by axial compression of the housing jacket in a second deformation step, wherein an inside radius of the expansion bead corresponds approximately to a wall thickness of the housing jacket and the expansion bead traverses a path in the housing jacket that comprises four substantially straight portions, at least two of the substantially straight portions being at substantially right angles to one another; and wherein the expansion bead traverses a portion of an outer contour of the first longitudinal bead and a portion of an outer contour of the second longitudinal bead.

2. The method as claimed in claim 1, wherein the first method step, production of a preliminary form of the bead, and the second method step, axial compression of the housing jacket, are carried out in a mold.

3. The method of claim 2, wherein the step comprising the provision of a housing jacket having a noncircular cross section which is cut to size further comprises the provision of the housing jacket with an approximately quadrilateral cross section.

4. A heat exchanger, in particular an exhaust gas heat exchanger for motor vehicles, comprising a bank of tubes through which a gaseous medium flows and around which a liquid coolant flows, and the tubes of which are held by their tube ends in tube plates and are connected thereto with a cohesive material joint, and having a housing jacket comprising a non-circular cross section which surrounds the bank of tubes and is connected on the end side to the tube plates with a cohesive material joint and through which the coolant flows, the tubes, tube plates and housing jacket being produced from a heat-resistant and corrosion-resistant metallic alloy, wherein the housing jacket comprises at least one contiguous expansion bead traversing a path in the housing jacket that comprises four substantially straight portions, at least two of the straight portions being at substantially right angles to one another, and whose inside radius corresponds approximately to the wall thickness of the housing jacket; and first and second longitudinal beads for stiffening the housing jacket; wherein the contiguous expansion bead traverses a portion of an outer contour of the first longitudinal bead and a portion of an outer contour of the second longitudinal bead.

5. The heat exchanger as claimed in claim 4, wherein the housing jacket is of integral design.

6. The heat exchanger as claimed in claim 4, wherein the housing jacket is produced from a welded tube.

7. The heat exchanger as claimed in claim 4, wherein the expansion bead is produced by internal high pressure forming (IHF) of the housing jacket.

8. The heat exchanger as claimed in claim 4, wherein the expansion bead is produced by axial compression of the housing jacket.

9. The heat exchanger as claimed in claim 4, wherein the housing jacket has a wall thickness of $0.5 \leq s \leq 2.5$ mm.

10. The heat exchanger as claimed in claim 9, wherein the expansion bead has a height h of $2 \leq h \leq 10$ mm.

11. The heat exchanger as claimed in claim 10, wherein the expansion bead has a height of approximately 6 mm.

12. The heat exchanger as claimed in claim 9, wherein the expansion bead has a width b of $4 \leq b \leq 8$ mm.

13. The heat exchanger as claimed in claim 12, wherein the expansion bead has a width of approximately 6 mm.

14. The heat exchanger as claimed in claim 9, wherein the ratio of a width of the expansion bead to a height of the expansion bead b:h of approximately 1.

15. The heat exchanger as claimed in claim 9, wherein the bead has a bending radius of R3 of approximately s.

16. The heat exchanger as claimed in claim 9, wherein the housing jacket has a wall thickness of approximately 1.5 mm.

17. The heat exchanger as claimed in claim 4, wherein the housing jacket comprises a tube with an approximately quadrilateral cross section.

18. A heat exchanger, in particular an exhaust gas heat exchanger for motor vehicles, comprising a housing jacket having an approximately quadrilateral cross-section with inwardly extending longitudinal beads at the corners thereof and further comprising a bank of tubes through which a gaseous medium flows and around which a liquid coolant flows, the tubes of which are held by their tube ends in tube plates and are connected thereto with a cohesive material joint, wherein the housing jacket surrounds the bank of tubes and is connected on the end side to the tube plates with a cohesive material joint and through which the coolant flows, the tubes, tube plates and housing jacket being produced from a heat-resistant and corrosion-resistant metallic alloy, wherein the housing jacket comprises at least one contiguous expansion bead whose inside radius corresponds approximately to the wall thickness of the housing jacket.

* * * * *